United States Patent
Barnum et al.

(10) Patent No.: US 10,652,717 B2
(45) Date of Patent: *May 12, 2020

(54) SYSTEMS AND METHODS FOR PROVIDING AN INTERACTIVE COMMUNITY THROUGH DEVICE COMMUNICATION

(71) Applicant: Capital One Financial Corporation, McLean, VA (US)

(72) Inventors: Eric K. Barnum, Midlothian, VA (US); Anthony Reynolds, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 13 days.

This patent is subject to a terminal disclaimer.

(21) Appl. No.: 15/812,873

(22) Filed: Nov. 14, 2017

(65) Prior Publication Data

US 2018/0070194 A1    Mar. 8, 2018

Related U.S. Application Data

(63) Continuation of application No. 14/719,782, filed on May 22, 2015.
(Continued)

(51) Int. Cl.
*G06F 15/16* (2006.01)
*H04W 4/70* (2018.01)
(Continued)

(52) U.S. Cl.
CPC .......... *H04W 4/70* (2018.02); *H04L 65/1069* (2013.01); *H04L 65/403* (2013.01);
(Continued)

(58) Field of Classification Search
CPC ..... H04L 63/104; H04L 67/125; H04L 51/32; H04L 63/10; H04L 67/16; H04L 65/403; H04L 51/00; H04L 67/18; G06F 17/30477; G06F 17/30699; G06F 3/04812; G06F 10/00; G06F 30/06; G06Q 10/00; G06Q 10/10; G06Q 50/01; G06Q 30/02;
(Continued)

(56) References Cited

U.S. PATENT DOCUMENTS 6,742,032 B1 * 5/2004 Castellani .............. G06Q 30/02
                                                                709/205
6,775,833 B1 * 8/2004 Gits ........................ H04L 67/16
                                                                709/223

(Continued)

*Primary Examiner* — Dustin Nguyen
(74) *Attorney, Agent, or Firm* — Finnegan, Henderson, Farabow, Garrett & Dunner, LLP

(57) ABSTRACT

A wave device is disclosed. The wave device may include one or more memory devices storing instructions and one or more processors configured to execute the instructions to receive a unique identifier associated with a community and generate a communication including the unique identifier associated with the community and enabling a second wave device to join the community. The one or more processors may be further configured to transmit the communication to the second wave device based on geographic proximity to the second wave device, and share information with the second wave device based on the second wave device joining the community.

17 Claims, 9 Drawing Sheets

Related U.S. Application Data

(60) Provisional application No. 62/002,419, filed on May 23, 2014, provisional application No. 62/022,738, filed on Jul. 10, 2014.

(51) Int. Cl.

| | | |
|---|---|---|
| *H04L 29/06* | (2006.01) | |
| *H04W 4/08* | (2009.01) | |
| *H04L 29/08* | (2006.01) | |
| *H04W 4/02* | (2018.01) | |
| *G06Q 50/00* | (2012.01) | |

(52) U.S. Cl.
CPC ........... *H04L 67/1095* (2013.01); *H04W 4/08* (2013.01); *G06Q 50/01* (2013.01); *H04L 67/30* (2013.01); *H04W 4/023* (2013.01)

(58) Field of Classification Search
CPC .......... G06Q 30/06; A63F 13/12; H04W 4/08; H04W 4/70; H04W 92/02; G06B 25/005; H04M 1/72544; H04M 3/42; H04M 7/0036
See application file for complete search history.

(56) References Cited

U.S. PATENT DOCUMENTS

| | | | | |
|---|---|---|---|---|
| 8,326,752 | B2* | 12/2012 | Kaneuchi | G06Q 30/06 705/39 |
| 9,137,194 | B1 | 9/2015 | Wren | |
| 9,330,391 | B1* | 5/2016 | Bai | G06Q 50/01 |
| 9,582,139 | B1* | 2/2017 | Tseng | G06F 3/04812 |
| 2002/0059222 | A1 | 5/2002 | Sasaki | |
| 2002/0156917 | A1* | 10/2002 | Nye | H04L 63/104 709/238 |
| 2006/0112054 | A1 | 5/2006 | Jeanblanc | |
| 2006/0218000 | A1* | 9/2006 | Smith | G06Q 10/00 709/204 |
| 2007/0223436 | A1* | 9/2007 | Lenardi | H04L 63/10 370/338 |
| 2008/0039121 | A1* | 2/2008 | Muller | H04M 7/0036 455/456.3 |
| 2008/0056282 | A1* | 3/2008 | Moon | H04W 92/02 370/401 |
| 2008/0077529 | A1* | 3/2008 | Swanburg | G06Q 10/00 705/45 |
| 2008/0113674 | A1* | 5/2008 | Baig | G06Q 10/10 455/456.3 |
| 2008/0126113 | A1 | 5/2008 | Manning | |
| 2008/0162260 | A1 | 7/2008 | Rohan | |
| 2008/0313262 | A1* | 12/2008 | Cho | G06Q 30/06 709/201 |
| 2009/0015660 | A1 | 1/2009 | Vedantham | |
| 2009/0221307 | A1* | 9/2009 | Wolak | G06Q 10/10 455/466 |
| 2009/0249401 | A1 | 10/2009 | Squedin | |
| 2010/0062796 | A1* | 3/2010 | Hayton | H04M 1/72544 455/466 |
| 2010/0125611 | A1* | 5/2010 | Boutboul | G06F 17/30699 707/794 |
| 2010/0211674 | A1* | 8/2010 | Sugahara | G06Q 10/00 709/224 |
| 2010/0222147 | A1* | 9/2010 | Langan | A63F 13/12 463/42 |
| 2012/0092161 | A1* | 4/2012 | West | G08B 25/005 340/540 |
| 2012/0134282 | A1* | 5/2012 | Tirronen | H04W 4/70 370/252 |
| 2013/0143535 | A1* | 6/2013 | Leppanen | H04W 4/08 455/414.1 |
| 2013/0196690 | A1* | 8/2013 | Crowley | H04M 3/42 455/456.3 |
| 2013/0198281 | A1* | 8/2013 | Scuba | H04L 67/18 709/204 |
| 2013/0254408 | A1* | 9/2013 | Sreenivasan | G06Q 50/01 709/227 |
| 2013/0304772 | A1* | 11/2013 | Fay | G06Q 50/01 707/821 |
| 2014/0025734 | A1* | 1/2014 | Griffin | G06Q 50/01 709/204 |
| 2014/0067972 | A1* | 3/2014 | Kageyama | H04L 51/32 709/206 |
| 2014/0229503 | A1* | 8/2014 | Li | G06F 17/30477 707/770 |
| 2014/0282096 | A1* | 9/2014 | Rubinstein | H04L 65/403 715/753 |
| 2014/0310349 | A1 | 10/2014 | Rainisto | |
| 2014/0359012 | A1 | 12/2014 | Watanabe | |
| 2015/0012332 | A1* | 1/2015 | Papachristos | H04L 67/125 705/7.29 |
| 2015/0016364 | A1 | 1/2015 | Junell | |

* cited by examiner

SYSTEMS AND METHODS FOR PROVIDING AN INTERACTIVE COMMUNITY THROUGH DEVICE COMMUNICATION

CROSS-REFERENCE TO RELATED APPLICATIONS

This application is a continuation of U.S. patent application Ser. No. 14/719,782 filed May 22, 2015, which claims priority under 35 U.S.C. § 119 to U.S. Provisional Patent Application No. 62/002,419, filed on May 23, 2014, and U.S. Provisional Patent Application No. 62/022,738, filed on Jul. 10, 2014. The aforementioned applications are incorporated herein by reference in their entireties.

TECHNICAL FIELD

The disclosed embodiments generally relate to systems and methods for device communication, and more particularly, to systems and methods for providing an interactive community through device communication.

BACKGROUND

An event, such as an event where people have gathered in proximity to the event and/or each other, defines a relevant attribute of those people that are associated with the event. For example, people that attend a sporting event share the common characteristic of attending the event. Similarly, people stuck in a traffic jam share a common experience as they sit in their vehicles. In many instances, the attributes of an event's occurrence and the location of people in proximity to each other (physically or virtually) create an opportunity to share information in the context of the event. Even though these people may not know each other, these shared experiences create a basis for valuable communication, such as to enhance the event experience, disseminate information, etc.

Current technology, however, may not allow a group of people associated with an event to easily and efficiently communicate with each other. In particular, common computer-enabled communication methods, such as email, text messaging, and social media, may be limited in their ability to establish and direct communication between a group of people on the basis of proximity. Therefore, it may be difficult for people participating in an event and/or sharing common interests to easily communicate with each other.

SUMMARY

The disclosed embodiments include systems and methods that enable communication through the transmission and/or receipt of a unique identifier.

Consistent with a disclosed embodiment, a wave device is provided. The wave device may include one or more memory devices storing instructions and one or more processors configured to execute the instructions to receive a unique identifier associated with a community and generate a communication including the unique identifier associated with the community and enabling a second wave device to join the community. The one or more processors may be further configured to transmit the communication to the second wave device based on geographic proximity to the second wave device, and share information with the second wave device based on the second wave device joining the community.

Consistent with another disclosed embodiment, a wave device is provided. The wave device may include one or more memory devices storing instructions and one or more processors configured to execute the instructions to receive a unique identifier associated with a community from a second wave device based on geographic proximity to the second wave device, transmit the unique identifier associated with the community to a data collection device, and receive information associated with the community from the data collection device, the information including an invitation to join the community.

Consistent with another disclosed embodiment, a system for providing an interactive community is provided. The system may include one or more memory devices storing instructions and one or more processors configured to execute the instructions to receive a request to generate a community from a first wave device, the request including information describing the community. The one or more processors may be further configured to generate a unique identifier associated with the community based on the request, transmit the unique identifier associated with the community to the first wave device, receive the unique identifier associated with the community from a second wave device, and transmit the information describing the community to the second wave device and an invitation to join the community.

Consistent with another disclosed embodiment, a system for providing an interactive community is provided. The system may include one or more memory devices storing instructions and one or more processors configured to execute the instructions to identify, by the one or more processors, a plurality of wave devices that are associated with a community based on data stored as part of a community profile associated with the community, receive additional data associated with the plurality of wave devices, and determine an attribute of the community based at least on the additional data. In addition, the plurality of wave devices may be associated with the community through wave interactions that resulted in each of the plurality wave devices joining the community.

Although disclosed embodiments are discussed primarily in the context of mobile devices and software instructions that are executed by those mobile devices, other implementations are contemplated. For example, disclosed embodiments may include software instructions that are executed by a computing system, such as a desktop computer, a laptop, etc. Moreover, the configuration and architecture, etc. of the computing systems, mobile or non-mobile, are not limiting to the disclosed embodiments. Systems or components that execute software instructions to perform one or more operations consistent with the disclosed embodiments and/or store information generated and/or used by the disclosed embodiments, may be particularly configured to perform the one or more particular operations consistent with the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
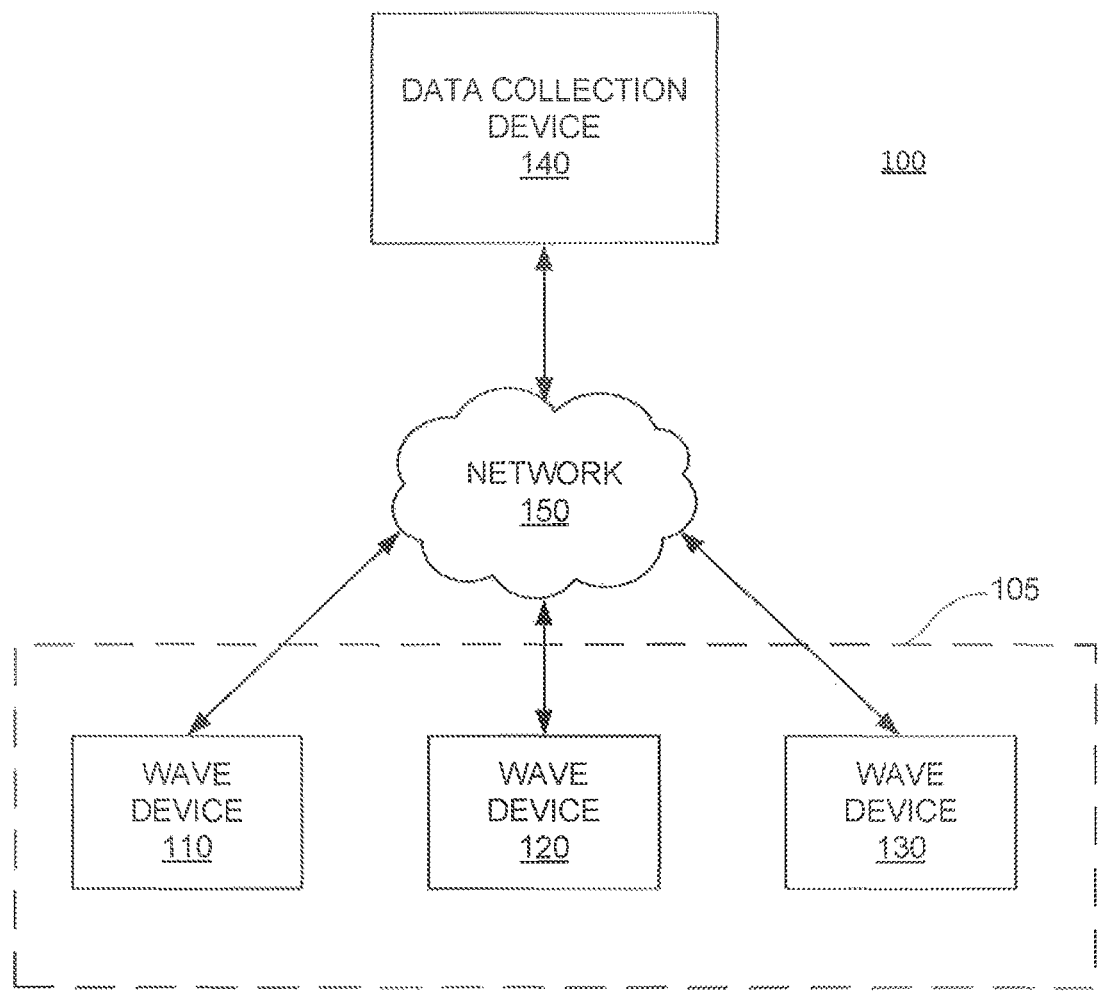
FIG. 1 illustrates an exemplary system consistent with disclosed embodiments.

Reference will now be made in detail to the disclosed embodiments, examples of which are illustrated in the accompanying drawings. Wherever convenient, the same reference numbers will be used throughout the drawings to refer to the same or like parts.

Disclosed embodiments pertain to device communication in the form of an interactive community. The interactive community may include a selected plurality of devices that create and/or join the community, and that share information with each other. For example, a device may post a message that is received by other devices in the community. In some embodiments, a device may join the community as a result of communication with another device that either created, joined, or could join the community. In this way, a community may include devices that have a relevant association with the community. For example, a community may be formed based on communication between proximate devices.

In some embodiments, a community may be created based on an event. That is, a selected plurality of devices that are part of the community may have some relationship to an event. The event may be any occurrence associated with a group of people that are in proximity to each other for a period of time. The people may be associated based on their proximity to and/or experiencing of the event. The event may be planned or spontaneous. In other embodiments, communities may be created and/or joined based on reasons other than relationship to an event.

A device may create a community based on user input. For example, a user may recognize an event and provide input to a device that causes the device to create a community. For instance, the device may communicate with a data collection device to create a community. In other embodiments, a data collection device may automatically create a community (e.g., based on information indicating that a plurality of devices are in proximity to each other).

After an interactive community is created, wave-based device communication may allow devices to join the community. Wave-based device communication is described in detail in provisional application 62/002,419, which is hereby incorporated by reference in its entirety. Wave-based device communication includes wave interactions between devices in which a unique identifier associated with a person, place, entity, or object is transmitted to another device over a network. In some instances, the wave interaction may be based on a proximity between the devices. As used herein, proximity may refer to geographic proximity (e.g., a distance between two points), however, it is not limited thereto. For example, when two devices are within a geographic proximity that allows for a connection (e.g., a Bluetooth® connection), each device may transmit a unique identifier to the other. In addition, the devices may transmit payloads of additional information to each other.

Consistent with disclosed embodiments, a wave device and/or a data collection device may generate a unique identifier associated with a community, which may be added to the payload of the wave device. The wave device may thereafter transmit the unique identifier associated with the community to other wave devices through wave interactions. Wave devices that receive the unique identifier associated with a community may add the unique identifier to their respective payloads. This may be done regardless of whether the wave device joins the community. In this way, a unique identifier associated with a community may propagate throughout devices that are in proximity to each other.

Wave devices that receive the unique identifier associated with the community may provide information about the community to a user. For example, the wave device may display an invitation to join a community. The wave device may join the community, merge the community with another community, decline joining the community, etc., based on user input and/or other information.

A wave device may join the community through communication with a data collection device (e.g., the data collection device which created the community). Further communication between the devices that join the community and the data collection device may allow the people associated with the devices that make up the community to interact with each other (e.g., share information). In this way, an interactive community may facilitate communication between people, including people associated with proximal communities. Further, because the devices that join the community may have some relationship to each other (e.g., proximity, association with an event, etc.), the people that communicate with each other through the interactive community may have a relevant relationship to each other (e.g., proximity to and/or the experiencing of an event).

FIG. 1 is a diagram illustrating an exemplary system 100 for performing one or more operations consistent with the disclosed embodiments. In one embodiment, system 100 may include a plurality of wave devices 105, a data collection device 140, and a network 150. Wave devices 105 may include wave device 110, wave device 120, and wave device 130. The components and arrangement of the components included in system 100 may vary. Thus, system 100 may further include other components that perform or assist in the performance of one or more processes consistent with the disclosed embodiments. For example, while three wave devices 110, 120, and 130 are depicted, it should be understood that any number of wave devices 105 may be included in system 100.

Each wave device 105 may be one or more computing devices that are configured to execute software instructions for performing one or more operations consistent with the disclosed embodiments. In an exemplary embodiment, a "wave device" is any device that is capable of receiving and/or transmitting a unique identifier. Wave devices 105 may be any type of computing device, such as a mobile device (e.g., smart phone, tablet, etc.), laptop, desktop computer, server, beacon, sensor device, and/or any device capable of communicating with another device, such as a Bluetooth®-enabled device, WiFi-enabled device, RFID chip, etc.

In some embodiments, each wave device 105 may include one or more processors configured to execute software instructions stored in memory, such as memory included in each wave device 105. Each wave device 105 may include software that when executed by one or more processors performs known Internet-related communications and content display processes. For instance, each wave device 105 may execute browser software that generates and displays interfaces including content on a display device included in, or connected to, the respective wave device 105.

Each wave device 105 may be configured to store a unique identifier associated with a person, entity, place, or object. Each wave device 105 may store the unique identifier in a memory device. Each wave device 105 may store the unique identifier as part of a unique identifier (UID) profile. Each wave device 105 may be configured to transmit the unique identifier to other devices, such other wave device 105 and/or data collection device 140, via network 150.

In an exemplary embodiment, one or more of wave device 110, 120, 130 of wave devices 105 may be configured in the same or similar manner. It should be understood however, that wave devices 110, 120, and/or 130 may be configured differently. For example, one or more of wave devices 110, 120, and 130 may be configured to only receive or only transmit a unique identifier.

Data collection device 140 may include one or more computing systems that are configured to execute software instructions stored on one or more memory devices to perform one or more operations consistent with the disclosed embodiments. For example, data collection device 140 may include one or more memory device(s) storing data and software instructions and one or more processor(s) configured to use the data and execute the software instructions to perform server-based functions and operations known to those skilled in the art and related to the function and operations associated with data collection device 140. Moreover, in certain embodiments, data collection device 140 may be configured to execute software instructions that interact with software program(s) stored and executed by wave devices 105, such as a mobile application that is executed on a mobile device.

Data collection device 140 may be a general purpose computer, a mainframe computer, or any combination of these components. In certain embodiments, data collection device 140 (or a system including data collection device 140) may be configured as a particular apparatus, system, and the like based on the storage, execution, and/or implementation of the software instructions that perform one or more operations consistent with the disclosed embodiments. Data collection device 140 may be standalone, or it may be part of a subsystem, which may be part of a larger system. For example, data collection device 140 may represent distributed servers that are remotely located and communicate over a network (e.g., network 150).

In an exemplary embodiment, data collection device 140 may include or may connect to one or more storage devices configured to store data and/or software instructions used by one or more processors of data collection device 140 to perform operations consistent with disclosed embodiments. For example, data collection device 140 may include memory configured to store one or more software programs that performs several functions when executed by a processor. The disclosed embodiments are not limited to separate programs or computers configured to perform dedicated tasks. For example, data collection device 140 may include memory that stores a single program or multiple programs. Additionally, data collection device 140 may execute one or more programs located remotely from data collection device 140. For example, data collection device 140 may access one or more remote programs stored in memory of a remote component that, when executed, perform operations consistent with the disclosed embodiments.

In an exemplary embodiment, data collection device 140 may store information associated with unique identifiers, such as UID profiles. The UID profiles may include information identifying a person, entity, place, or object that is associated with the UID profile and the associated unique identifier. The UID profiles may also include information associated with interactions involving transmission of the associated unique identifier and/or receipt of another unique identifier. In addition, the UID profiles may include instructions for one or more actions to be triggered based on particular interactions that occur. For example, UID profiles may include instructions for actions to be triggered when a computing device receives the associated unique identifier and/or actions to be triggered when a computing device associated with the unique identifier receives another unique identifier.

In an exemplary embodiment, data collection device 140 may be configured to create, generate, store, maintain, facilitate, and/or otherwise provide an interactive community. Data collection device 140 may be configured to communicate with a wave device (e.g., one of wave device 105) to create a community and associate the community with a community profile. Data collection device 140 may be configured to generate and/or receive a unique identifier, and associate the unique identifier with a community. In some embodiments, data collection device 140 may be configured to automatically create a community based on certain criteria. For example, data collection device may automatically create a community based on information received as a result of wave interactions between wave devices 105.

In certain embodiments, data collection device 140 may be a component of one or more of wave devices 105. For example, wave device 110, 120, and/or 130 may include components configured to perform one or more of the processes of data collection device 140. For instance, a wave device 105 may be configured to provide an interactive community.

In certain embodiments, wave devices 105 may connect to data collection device 140 to retrieve information stored therein. For example, wave device 110 may access information associated with interactions that occurred that involved a transmission and/or receipt of a unique identifier, such as transmission of a unique identifier associated with a person operating wave device 110. In another example, wave device 110 may connect to data collection device 140 to provide information to be stored by data collection device 140.

In addition, data collection device 140 may send and receive information associated with a community. For example, wave device 110 may share information with data collection device 140, which may subsequently share the information with wave device 120. In this way, wave devices 105 may share information with each other through data collection device 140.

Network 150 may be any type of network configured to provide communications between components of system 100. For example, network 150 may be any type of network (including infrastructure) that provides communications, exchanges information, and/or facilitates the exchange of information, such as a Wide Area Network, a Local Area Network, a direct connection, or other suitable connection(s) that enables the sending and receiving of information between the components of system 100. For example, network 150 may facilitate connection via Bluetooth®, WIFI, RFID, NFC, radio, Ethernet, Internet, magnetic devices, infrared technology, etc.

Figure 2:
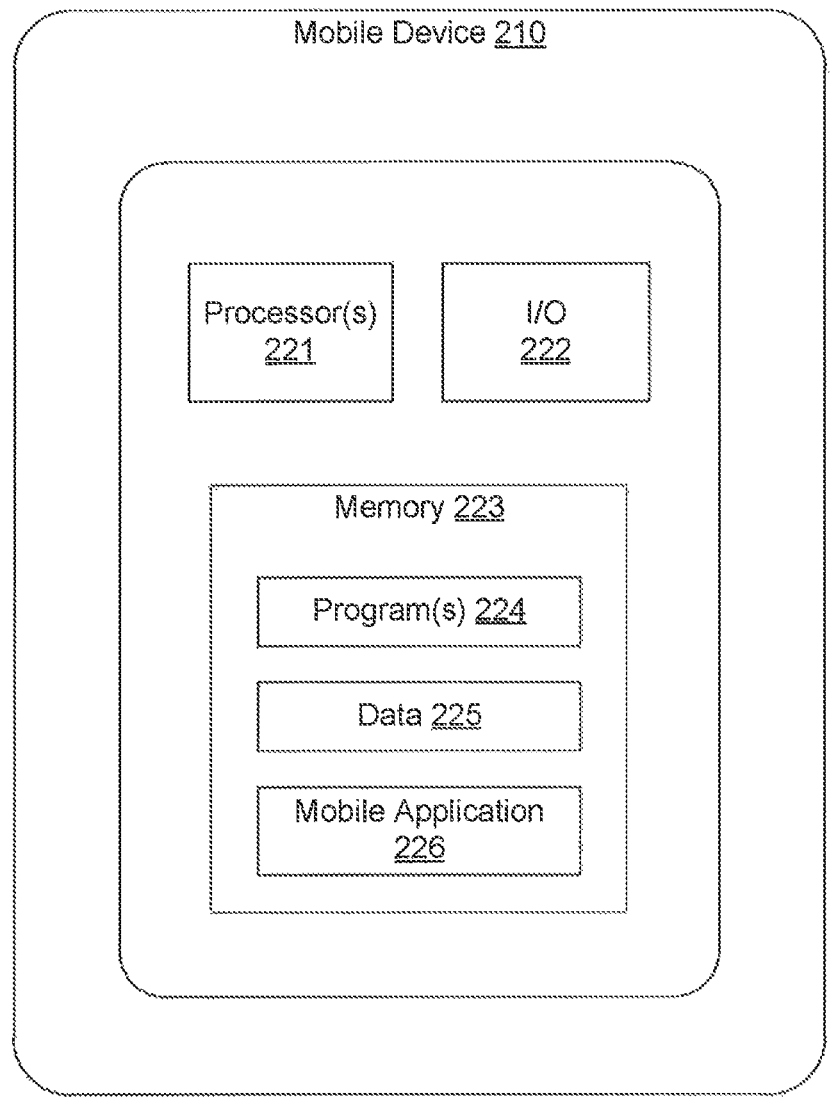
FIG. 2 is a block diagram of an exemplary client device computing system, consistent with disclosed embodiments.

FIG. 2 shows an exemplary mobile device 210, consistent with disclosed embodiments. In certain embodiments, mobile device 210 may embody wave device one or more of wave devices 105. It should be understood, however, that mobile device 210 may also embody data collection device 140 and/or a component not shown in FIG. 1. In one embodiment, mobile device 210 may include one or more processors 221, one or more input/output (I/O) devices 222, and one or more memories 223. In one embodiment, mobile device 210 may take the form of a general purpose computer, a mainframe computer, or any combination of these components. In some embodiments, mobile device 210 may be a personal computing device, such as a smartphone, tablet, laptop, desktop computer, etc.

In certain embodiments, mobile device 210 (or a system including mobile device 210) may be configured as a particular apparatus, system, and the like based on the storage, execution, and/or implementation of the software instructions that perform one or more operations consistent with the disclosed embodiments. Mobile device 210 may be standalone, or it may be part of a subsystem, which may be part of a larger system.

Processor 221 may include one or more known processing devices, such as a microprocessor from the Pentium™ or Xeon™ family manufactured by Intel™, the Turion™ family manufactured by AMD™, or any of various processors manufactured by Sun Microsystems. The disclosed embodiments are not limited to any type of processor(s) configured in mobile device 210.

I/O devices 222 may be one or more device that is configured to allow data to be received and/or transmitted by mobile device 210. I/O devices 222 may include one or more digital and/or analog communication devices that allow mobile device 210 to communicate with other machines and devices, such as other components of system 100.

Memory 223 may include one or more storage devices configured to store instructions used by processor 221 to perform functions related to the disclosed embodiments. For example, memory 223 may be configured with one or more software instructions, such as program(s) 224 that may perform one or more operations when executed by processor 221. The disclosed embodiments are not limited to separate programs or computers configured to perform dedicated tasks. For example, memory 223 may include a single program 224 that performs the functions of mobile device 210, or program 224 could comprise multiple programs. Additionally, processor(s) 221 may execute one or more programs located remotely from mobile device 210. For example, mobile device 210, may access one or more remote programs that, when executed, perform functions related to certain disclosed embodiments.

Memory 223 may also store data 225 that may reflect any type of information in any format that the system may use to perform operations consistent with the disclosed embodiments. For example, data 225 may include a unique identifier associated only a particular mobile device 210. Data 225 may also include stored information, such as information associated with an event to be triggered based on data communications received by mobile device 210.

In certain embodiments, memory 223 may store a mobile application 226. Mobile application 226 may be one or more programs or software instructions that, when executed by processor(s) 221, perform one or more operations associated with an entity associated with mobile application 226, such as a merchant or financial service provider. For example, mobile application 226 may be a mobile application that is stored in a mobile device (e.g., mobile device 210) that performs operations and generates interface(s) that are displayed on a display device of mobile device 210. The interface(s) may be configured to present information and provide request(s) that elicit input from a user. Mobile device 210 may be configured with known input hardware and software components that accept input from a user through known mobile device mechanisms, such as touch screen technologies, voice input, keypad entry, etc.

Mobile application 326 may be configured to use information to generate information, analyze and determine condition(s), generate results based on those condition(s), and provide data and interface(s) including the data. In certain aspects, mobile application 226 may be configured to perform one or more processes consistent with the disclosed embodiments, such as, for example, determining information to be displayed to a user, stored in a memory, and/or transmitted to another device as a result of receiving a unique identifier.

Figure 3:
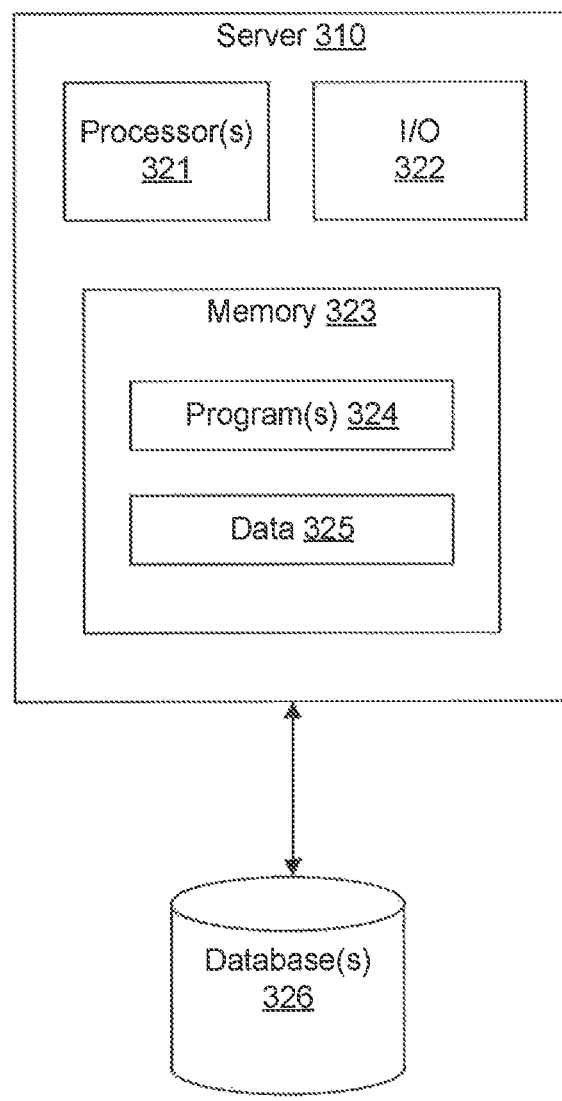
FIG. 3 is a block diagram of an exemplary computing system, consistent with disclosed embodiments.

FIG. 3 shows an exemplary computing system including server 310, consistent with disclosed embodiments. In an exemplary embodiment, server 310 may embody data collection device 140. It should be understood, however, that the configuration and components of server 310 may additionally or alternatively represent that of one or more of wave device 105, and/or a component not shown in FIG. 1.

In one embodiment, server 310 may include one or more processors 321, one or more input/output (I/O) devices 322, and one or more memories 323. Alternatively, server 310 may take the form of a general purpose computer, a mainframe computer, or any combination of these components. In certain embodiments, server 310 (or a system including server 310) may be configured as a particular apparatus, system, and the like based on the storage, execution, and/or implementation of the software instructions that perform one or more operations consistent with the disclosed embodiments. Server 310 may be standalone, or it may be part of a subsystem, which may be part of a larger system.

Processor 321 may include one or more known processing devices, such as a microprocessor from the Pentium™ or Xeon™ family manufactured by Intel™, the Turion™ family manufactured by AMD™, or any of various processors manufactured by Sun Microsystems. The disclosed embodiments are not limited to any type of processor(s) configured in server 310.

I/O devices 322 may be one or more device that is configured to allow data to be received and/or transmitted by server 310. I/O devices 322 may include one or more digital and/or analog communication devices that allow server 310 to communicate with other machines and devices, such as other components of systems 100.

Memory 323 may include one or more storage devices configured to store instructions used by processor 321 to perform functions related to disclosed embodiments. For example, memory 323 may be configured with one or more software instructions, such as program(s) 324 that may perform one or more operations when executed by processor(s) 321. The disclosed embodiments are not limited to separate programs or computers configured to perform dedicated tasks. For example, memory 323 may include a single program 324 that performs the functions of the server 311, or program 324 could comprise multiple programs. Additionally, processor 321 may execute one or more programs located remotely from server 311. For example server 310, may access one or more remote programs that, when executed, perform functions related to certain disclosed embodiments.

Memory 323 may also store data 325 that may reflect any type of information in any format that the system may use to perform operations consistent with the disclosed embodiments. For example data 325 may include stored user information associated with one or more unique identifiers.

Server 310 may also be communicatively connected to one or more database(s) 326. Server 310 may be communicatively connected to database(s) 326 through network 150. Database 326 may include one or more memory devices that store information and are accessed and/or managed through server 310. By way of example, database(s) 326 may include Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, etc. Systems and methods of disclosed embodiments, however, are not limited to separate databases. In one aspect, server 310 as exemplified in FIG. 3 may include database 326. Alternatively, database 326 may be located remotely from the server 310. Database 326 may include computing components (e.g., database management system, database server, etc.) configured to receive and process requests for data stored in memory devices of database(s) 326 and to provide data from database 326.

Wave devices 105 may be configured as mobile device 210, server 310, or another computing device that includes one or more of the components of mobile device 210 and/or server 310. Regardless of their particular configuration, wave devices 110 and 120 may be configured to take part in a wave interaction. A "wave interaction" may be any interaction between a person, entity, place, or object and another person, entity, place, or object that results in a wave device receiving and/or transmitting a unique identifier.

For example, a person carrying wave device 110 may walk (or drive, ride, etc.) past a person carrying wave device 120. As a result, wave device 110 and wave device 120 may automatically connect to each other via network 150 (e.g., via a Bluetooth® connection) and exchange unique identifiers respectively stored thereon. It should be understood, however, that receipt and/or transmission of a unique identifier may not necessarily occur during an interaction. For example, a user may operate a computing device to manually transmit a unique identifier to another computing device after an interaction occurs.

It should be understood that any number of wave devices 105 may be included in system 100. Each wave device may be configured to take part in a wave interaction to receive and/or transmit a unique identifier. Each wave device may be configured to subsequently perform one or more processes associated with the wave interaction. For example, each wave device may store information (e.g., in an associated memory, in data collection device 140, etc.) associated with the wave interaction, such as when and where the wave interaction occurred, as well as any unique identifiers received as a result of the wave interaction. In another example, a wave device may transmit additional information (e.g., a community unique identifier) to another wave device as a result of a wave interaction.

The unique identifiers described herein may refer to wave unique identifiers and/or community unique identifiers. In an exemplary embodiment, a wave unique identifier (hereinafter "UID") may be any information that is unique to and exclusively identifies an associated person, entity, place, and/or object. Similarly, a community unique identifier (hereinafter "communityUID") may be any information that is unique to and exclusively identifies an interactive community. Each unique identifier (UID and communityUID) may be a systematically- and/or randomly-assigned alphanumeric string configured to be received, stored, and transmitted as data. In certain aspects, data collection device 140 may be configured to execute software instructions that perform unique identifier assigning processes that assign a person, place, entity, object, or community with a unique identifier and store the information in a data structure stored in a memory device(s).

In one example, data collection device 140 (or another component) may associate a UID with a person. The UID may be "unique" to and exclusively identify the person. The person may also be associated with one or more wave devices (e.g., one or more wave device 105). For example, the person may own, carry, possess, or otherwise control one or more computing devices configured to be used in a wave interaction to transmit their UID to another device and/or receive another UID.

A wave device 105 associated with the person may be configured to store the UID (e.g., as part of a UID profile). The wave device may store one or more programs and/or data configured to associate the person, the UID, and the wave device. By associating the person, UID, and wave device, interactions involving the person may be defined as wave interactions through the wave device transmitting the UID to another wave device. For example, when the person moves to within a certain proximity of another person (an "interaction"), a wave device may come into proximity with a wave device associated with the other person. The wave device may connect to the other wave device and transmit the UID to the other wave device (thus the interaction is a "wave interaction").

In some embodiments, a wave device may include additional information associated with a person and/or UID. For example, the wave device may store a historical list of received unique identifiers ("UID receipt history"). For example, the UID receipt history may include all unique identifiers (UID and communityUID) that were received by the wave device as a result of a wave interaction involving a person associated with the wave device. It should be understood that UID receipt history may not be limited to unique identifiers received by one wave device, and instead may include all unique identifiers received by all wave devices associated with a person and their UID.

In another example, a wave device may store a payload. A payload may include data that may be selectively transmitted to another device as a result of a wave interaction. For example, a payload may include a message to be transmitted to another wave device and used by the other wave device in one or more processes. The message may include, for example, textual data, image data, video data, audio data, program instructions, etc., which the other wave device may use to display a textual message, an image, a video, play audio, execute program instructions, etc. In another example, a message may include advertisements, promotions, or information about an organization's community, such as messages originating from a wave device associated with a business entity.

In another example, a payload may include a UID receipt history. That is, a wave device may transmit a UID receipt history as part of a payload, as a result of a wave interaction. In this way, the other wave device may receive a UID associated with the person and wave device, and a list of unique identifiers that were received as a result of previous wave interactions involving the person.

Further, in an exemplary embodiment, a payload may include one or more communityUIDs. For example, a wave device that creates and/or joins a community may store the communityUID associated with that community as part of their payload. For instance, the wave device may add the communityUID to a UID receipt history. Additionally or alternatively, the wave device may store a dedicated communityUID receipt history. In this way, a wave device, by transmitting a payload to another wave device through a wave interaction, may share a received communityUID.

It should be understood that any number of people may each be associated with respective UID(s) and wave device(s) in substantially the same manner as described above. As people interact with each other, wave interactions may occur between their wave devices, causing unique identifiers and payloads to be transmitted and/or received as a result.

Further, while a person associated with a UID is described above, it should be understood that the description also applies to a UID that is associated with an entity, place, and/or object. For example, a wave device, which may store a UID associated with the entity, place, or object, may be operated by a person on behalf of the entity, place, or object and be used in wave interactions.

Figure 4:
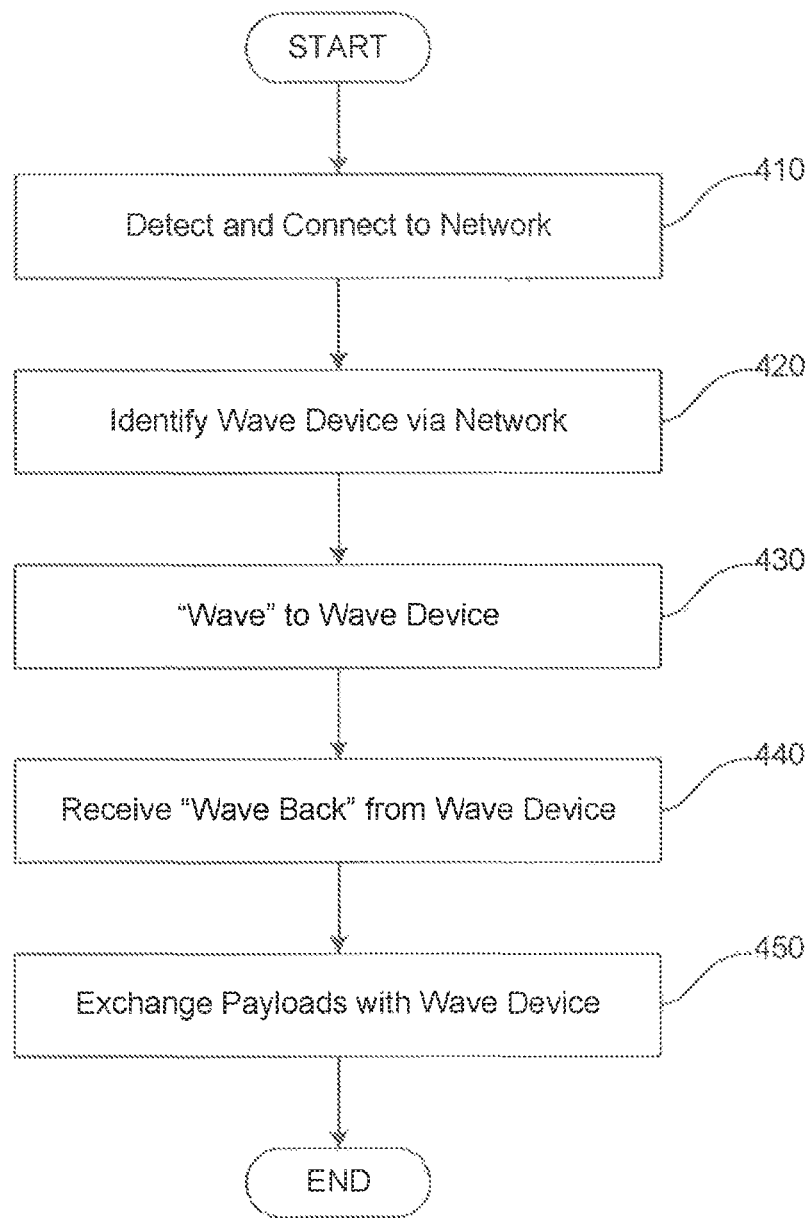
FIG. 4 is a flowchart of an exemplary automatic wave interaction process, consistent with disclosed embodiments.

FIG. 4 shows a flowchart of an exemplary automatic wave interaction process 400, consistent with disclosed embodiments. In one embodiment, wave device 110 may perform one or more operations of process 400 to perform a wave interaction with wave device 120. However, it should be understood that wave device 120 and/or wave device 130 may similarly perform process 400. Wave devices 110 and 120 may each be associated with and store a UID. For example, wave devices 110 and 120 may be associated with UIDs associated with people.

Wave device 110 may detect and connect to a network (step 410). For example, one or more components of wave device 110 may be configured to receive network signals such that wave device 110 may detect that a network or direct connection is within range. As has been described, the network may be network 150, which may be a local connection using Bluetooth®, WIFI, or other conventional network. Wave device 110 may connect to the network in a conventional manner.

Wave device 110 may identify a computing device via the connected network (step 420). For example, wave device 110 may identify wave device 120 through network 150, which may be, for instance, a Bluetooth® connection or a WiFi connection. In an exemplary embodiment, wave device 110 may identify a computing device based at least in part on proximity between the devices. For example, wave device 110 may connect to wave device 120 when wave device 110 and wave device 120 are located within a certain proximity to each other (e.g., a proximity that results in a Bluetooth® connection, WiFi connection, NFC communication, etc.). It should be understood that steps 410 and 420 encompass connections in which wave device detects and connects to another computing device without first detecting a network (i.e., detection and connection to another computing device constitutes detection and connection to a network). Once a connection is established, wave device 110 may attempt to communicate with wave device 120 to perform a wave interaction.

Wave device 110 may "wave" to wave device 120 (step 430). For example, wave device 110 may transmit a UID associated with wave device 110 (hereinafter "UID110") to wave device 120. In addition, wave device 110 may look for a "wave back" from wave device 120. For example, wave device 110 may boost power to a communication device and look for a signal transmitted to wave device 110.

Wave device 110 may receive a "wave back" from wave device 120 (step 440). For example, wave device 110 may receive a unique identifier transmitted from wave device 120 to wave device 110. The received unique identifier may be a unique identifier associated with wave device 120 (hereinafter "UID120"). After step 440, wave device 110 may have received UID120 and wave device 120 may have received UID110.

In addition to exchanging unique identifiers, wave device 110 may exchange additional information with wave device 120 (step 450). For example, wave device 110 may transmit a payload to (hereinafter "outgoing payload") and receive a payload from (hereinafter "incoming payload") wave device 120. In an exemplary embodiment, the outgoing payload may include a UID receipt history associated with UID110 (e.g., a list of unique identifiers, including UIDs and communityUIDs previously received by a wave device (e.g., wave device 110) as a result of a wave interaction involving UID110). Similarly, the incoming payload may include a UID receipt history associated with UID120 (e.g., a list or unique identifiers, including UIDs and communityUIDs, previously received by a wave device (e.g., wave device 120) as a result of a wave interaction involving UID120.)

In another example, the outgoing and incoming payloads may include one or more messages. The one or more messages may be, for example, textual data, image data, video data, audio data, program instructions, and/or the like. For example, wave device 110 may transmit an outgoing payload to wave device 120 that includes data and/or programs that wave device 120 may use to display a textual message to a user. The incoming payload may similarly include data and/or programs that wave device 110 may use to provide information to a user of wave device 110.

After wave device 110 and wave device 120 exchange payloads, process 400 may end. As a result of process 400, wave device 110 may have received UID120, wave device 120 may have received UID110, and wave devices 110 and 120 may have exchanged payloads (which may include exchanging of one or more communityUIDs). In this way, two computing devices, such as mobile devices, may facilitate communication based on proximity to each other. For example, when two people are near each other (e.g., next to each other at an event) associated computing devices may connect to each other and complete a wave interaction to exchange unique identifiers and payloads as a result.

In addition, wave device 110 and/or wave device 120 may store information to record the wave interaction. For example, wave device 110 may record the time, date, and location of a wave interaction, as well as a received unique identifier (e.g., UID120) and a received payload, including a UID receipt history (e.g., by adding unique identifiers of the UID receipt history to a UID receipt history associated with wave device 110).

Further, wave device 110 may communicate with data collection device 140 to further use, store, and analyze information associated with a wave interaction. For example, wave device 110 may transmit information associated with one or more wave interactions to data collection device 140 over network 150 (e.g., via an Internet connection). Data collection device 140 may perform one or more processes with information received from wave device 110 (and/or another wave device).

In an exemplary embodiment, wave devices 105 may operate in conjunction with data collection device 140 to provide an interactive community through wave interactions (e.g., through automatic wave interaction process 400). For example, wave device 120 may receive a communityUID as a result of a wave interaction with wave device 110. Wave device 120 may transmit the communityUID to data collection device 140, which may provide information about the community associated with the communityUID back to wave device 120. Wave device 120 may join the community, merge the community with another community, and/or decline joining the community (e.g., based on user input) through further communication with data collection device 140. Exemplary processes for providing an interactive community are described in more detail below.

Figure 5:
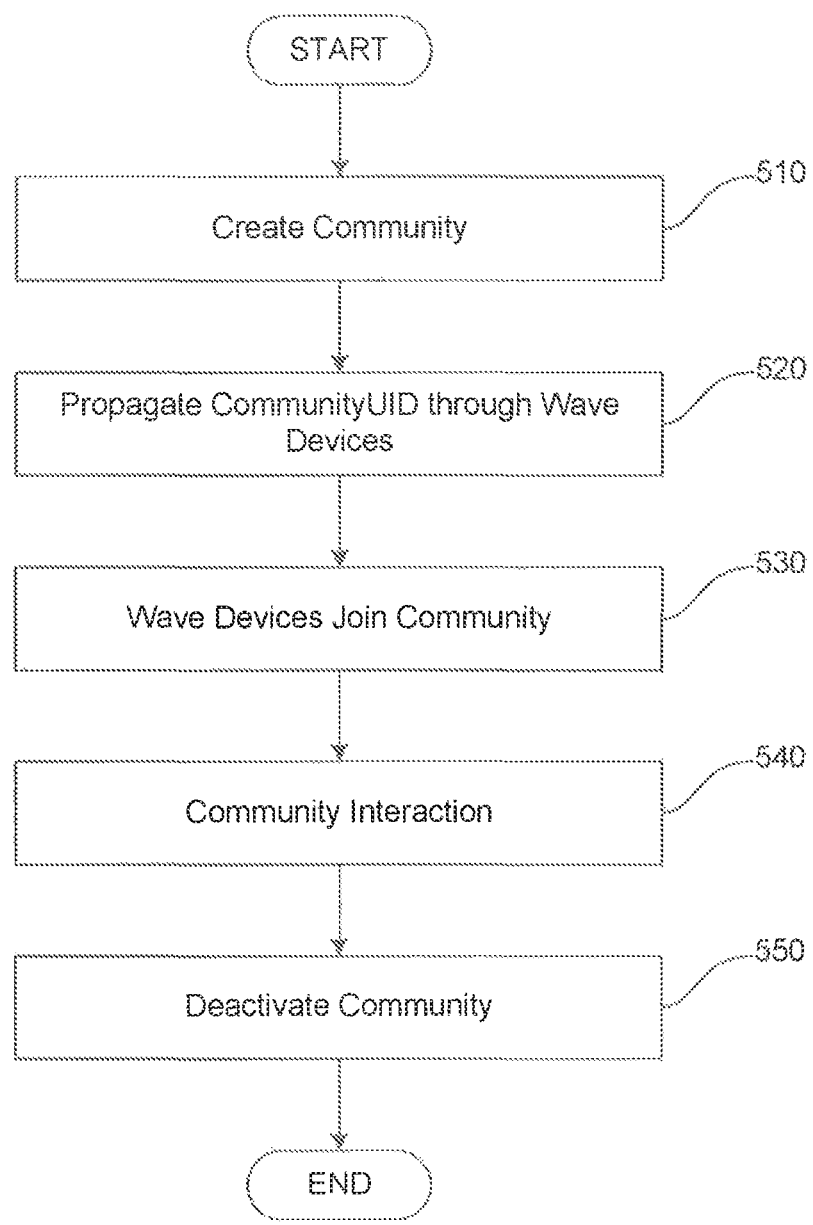
FIG. 5 is a flowchart of an exemplary interactive community communication process, consistent with disclosed embodiments.

FIG. 5 is a flowchart of an exemplary interactive community communication process 500. In an exemplary embodiment, one or more components of system 100 may perform process 500 to provide an interactive community. For example, wave devices 105 and/or data collection device 140 may execute software instructions to perform one or more operations associated with process 500 to allow people to communicate with each other through an interactive community.

Initially, wave device 110 and/or data collection device 140 may create a community (step 510). For example, data collection device 140 may create a community based on information received from wave device 110 (and/or other wave devices 105). In one example, data collection device 140 may create a community based on a user request received from wave device 110. In another example, data collection device 140 may automatically create a community based on information received as a result of wave interactions involving wave device 110 (for example, an indication that a plurality of wave devices are in close proximity or the like).

In some embodiments, wave device 110 may receive a request to create a community. For example, a user of wave device 110 may operate wave device 110 to provide input that includes a request for a community to be created. In certain aspects, a user may request that a community be created for any reason. In an exemplary embodiment, however, a community may be created in association with an event. An event may be any occurrence that involves a group of people in proximity to each other for a period of time. For example, the football, baseball, or soccer game may be an event. Other examples of events include a concert, a wedding, a conference, a field trip, a traffic jam, and/or other occurrences that are associated with a particular location or area, but are not limited thereto.

In some aspects, creation of a community in association with an event may provide a communication channel between wave devices such that the users can communicate with other people associated with the event, by way of the community. For example, wave device 110 and/or data collection device 140 may create a community, and users may operate a wave device to communicate with other people who have wave devices such that the communicating wave devices form the community. For instance, a wave device may post messages to a virtual bulletin-board, which may be available to other wave devices in the community and serve as a means of joining a community. In another example, a community may serve as a means to identify members to create a more targeted community of users. For instance, in the example of a sporting event community, users associated with wave devices that join the sporting event community may differentiate into separate communities for either team, for vendors selling team apparel, subdivisions within a team for particular players, or events within the sporting event such as a contentious referee call.

In another embodiment, data collection device 140 may automatically create a community based on one or more factors. For example, data collection device 140 may automatically create a community based on information associated with wave interactions. For instance, data collection device 140, which may receive time, date, and location information associated with wave interactions, and may determine that a number of wave interactions within a particular area and period of time exceeds a threshold, which may indicate occurrence of an event. Based on the number of wave interactions exceeding a threshold, data collection device 140 may create a community.

In an exemplary embodiment, in creating a community, data collection device 140 (and/or wave device 110) may generate a communityUID to associate with the community. For example, data collection device 140 may generate a communityUID, store the communityUID in association with the community, and transmit the communityUID to wave devices 110. In some embodiments, data collection device 140 may also create a community profile associated with the communityUID.

After the community is created, additional processes may occur to allow other wave devices (e.g., wave device 120 and/or 130) to join the community. In an exemplary embodiment, the communityUID associated with the community may propagate through the wave devices (step 520). For example, the communityUID may be transmitted from wave device 110 (e.g., the wave device that requested creation of the community) to other wave devices 105 (e.g., wave device 120 and/or wave device 130).

In an exemplary embodiment, the communityUID may be transmitted to wave devices 105 via one or more wave interactions. For example, wave device 110, after receiving the communityUID from data collection device 140, may add the communityUID to a payload. By performing a wave interaction e.g., process 400), wave device 110 may transmit the payload to another wave device 105. The other wave device 105 may receive the payload, and thus receive the communityUID.

Wave devices 105 that receive a communityUID through a wave interaction may add the communityUID to their respective payloads (e.g., to a UID receipt history). These wave devices 105 may transmit their payloads to other wave devices through subsequent wave interactions. In this way, a communityUID may be transmitted to a plurality of wave devices 105. Further, because wave interactions may depend on proximity between people, entities, places, and/or objects, wave devices 105 that receive a communityUID may have some proximity-based relationship (e.g., wave devices 105 near an event).

Wave devices 105 that receive a communityUID through wave interactions (or other means) may use the communityUID to join the associated community (step 530). For example, wave device 120 may receive a communityUID from wave device 110 as a result of a wave interaction. Wave device 120 may transmit the communityUID to data collection device 140. Data collection device 140 and wave device 120 may execute software instructions to perform operations that generate an invitation to join the community. For example, wave device 120 may generate a user interface that prompts a user to provide input regarding whether the user elects for wave device 120 to join the community. Based on the input, wave device 120 may transmit information to data collection device 140 indicating that wave device 120 accepts the invitation to join the community. Wave device 120 may thereafter be a part of the community associated with the received communityUID.

As described, as a communityUID propagates through wave devices 105, a plurality of wave devices 105 may join the community. The plurality of joined wave devices (including wave device 110 that caused creation of the community) may interact with each other (step 540). For example, wave device 110 may provide information to data collection device 140 to be "posted" (e.g., made available) to the community. The information may include textual data, image data, video data, audio data, program instructions, etc., that data collection device 140 may associate with the community profile associated with the communityUID. In addition, data collection device 140 may associate additionally received or determined information, such one or more community attributes (e.g., membership information, location information, rate of information exchange, etc.) with the community profile. Each other wave device 105 that has joined the community may subsequently receive information (e.g., "posted" information, determined attributes, etc.) from data collection device 140.

In one example, wave device 110 and wave device 120 may each be a part of a community that was dynamically created based on existence of a traffic jam. Wave device 110 may receive information indicating the cause of the traffic jam (e.g., from a user that can see the cause), which may be sent to data collection device 140 and posted to the community (e.g., via a virtual bulletin-board). Wave device 120 may receive the information from data collection device 140 and display the information (e.g., to a user that may not be able to see the cause of the traffic jam).

In another example, wave devices 110, 120 may be wave devices associated with people attending a sporting event, and wave device 130 may be a wave device associated with an entity (e.g., a sports team) or a place (e.g., the stadium at which the sporting event is occurring). Wave device 130 may cause a community associated with the sporting event to be created. Wave devices 110 and 120 may receive the communityUID associated with the community through wave interactions with wave device 130 and/or each other, which may occur when people associated with wave devices 110 and 120 attend the sporting event (and thus come into proximity with each other and wave device 130, which may be positioned at the location of the sporting event). Wave device 110 may post information related to the sporting event (e.g., rooting interest, poll question, pictures, etc.). Wave device 120 may communicate with data collection device 140 to receive the posted information and post other information (e.g., respond to a post, answer a poll question, etc.).

In some embodiments, wave devices associated with users that are virtually present at an event (e.g., by viewing the event in the news or reading about it on the Internet), may join a community associated with the event as virtual participants. These wave devices may also receive information that is shared and/or made available through the community. In this way, a community may exceed its geography and time.

As illustrated through these examples, wave devices 105 may interact to share information through a community. In particular, wave devices 105 may interact to share relevant information associated with an event. But because an event may be temporary (e.g., a traffic jam clears up, a sporting event ends), a community may lose relevance over time. Therefore, at some point, a community may be deactivated (step 550). For example, data collection device 140 may deactivate a community upon expiration of a certain time period associated with the event (e.g., four hours for a baseball game) or once the frequency of content/information becoming posted to a community falls below a threshold (e.g., no posts in the last hour), etc.

In one embodiment, data collection device 140 may deactivate a community based on relevance factors associated with the community. Relevance factors may include information associated with the community, including information indicating the relevance of the community over time. For example, if a community is associated with an event, time since an event has ended may be a relevance factor. Community "activity," proximity between wave devices (e.g., the wave devices forming the community disperse), proximity to an event, etc. may also be relevance factors.

In some aspects, data collection device 140 may determine whether to deactivate a community depending on relevance factors associated with a type of community, which may relate to the creation of the community. In one example, an instantaneous community may be created (e.g., automatically by data collection device 140) based on wave interactions between wave devices exceeding a threshold and deactivated based on the wave interactions decreasing below another threshold. In another example, an ephemeral community may be created at the time of an event (e.g., a traffic jam) and deactivated after the event is over (e.g., all wave devices have left the area of the traffic jam). A residual community may also be created in association with an event (e.g., a sporting event), but may be created in anticipation of the event and last beyond the end of the event (e.g., until wave devices stop interacting through the community for a period of time). In another example, a persistent community may be created for any reason (e.g., a trending topic) and may be deactivated for any reason (e.g., lack of community "activity"). Data collection device 140 may consider the type of a community when determining whether to deactivate the community.

It should be understood that deactivation of a community may only include an adjustment to the accessibility associated with information associated with the community. For example, data collection device 140 may change a community such that wave devices that were previously members of the community may no longer have access to interact through the community. In some embodiments, however, data collection device 140 may retain a record of information associated with a community.

Through exemplary process 500, a plurality of wave devices (e.g., wave devices 105) may form an interactive community to allow sharing of information. Further, because the plurality of wave devices may be limited to wave devices that receive the associated communityUID, communities may be efficient and shared information may be relevant. For instance, because propagation of the communityUID may take place through wave interactions, communities may be formed by wave devices that are in proximity to each other at some point in time, and thus have some relationship. For example, the proximity of multiple wave devices as a result of an event allows the wave devices to propagate a communityUID to spread the community and share information associated with the event while the event is occurring.

Figure 6:
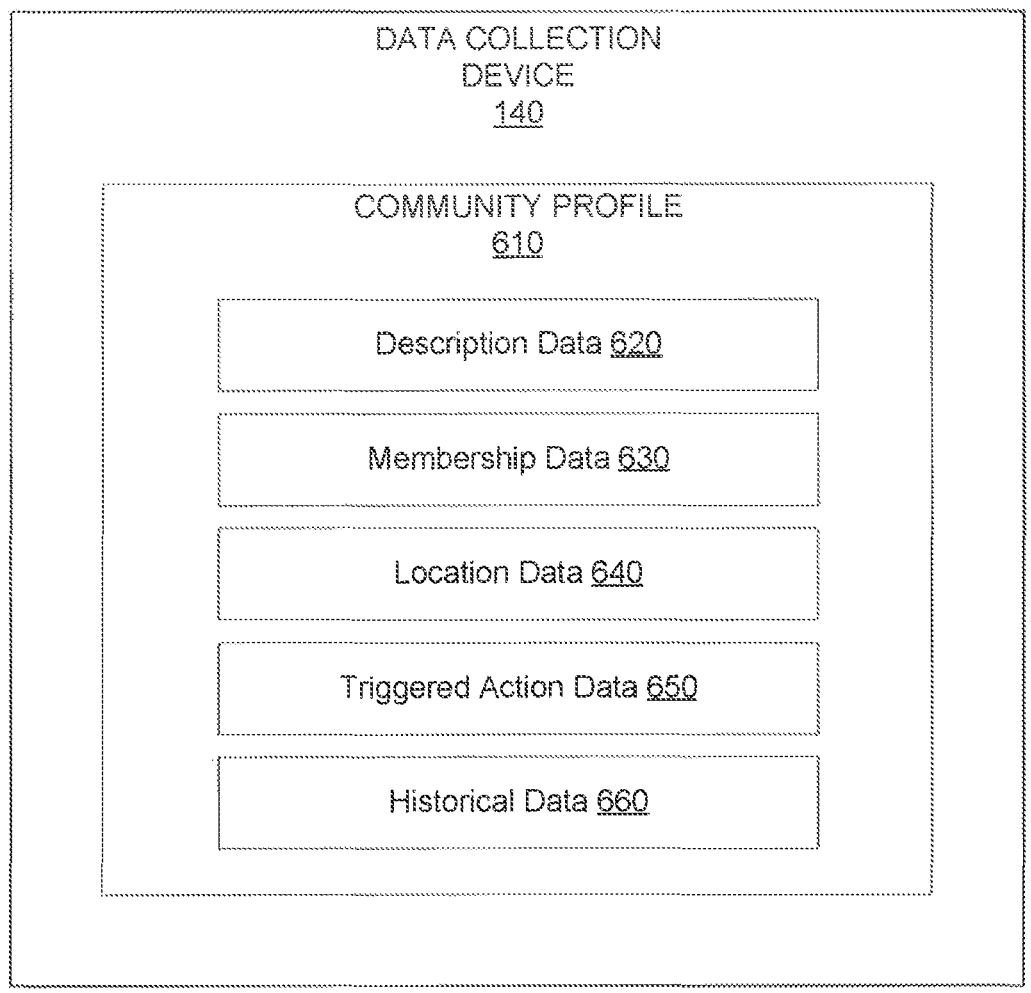
FIG. 6 is a block diagram of an exemplary data collection device and community profile data structure, consistent with disclosed embodiments.

As described in process 500, data collection device 140 may generate and store a community profile that is associated with a created interactive community. FIG. 6 is a block diagram of an exemplary data collection device 140 and an exemplary data structure associated with an exemplary community profile 610, consistent with disclosed embodiments. In one embodiment, data collection device 140 may store community profile 610 in a memory device. It should be understood, however, that another device, such as a wave device, may additionally or alternatively store community profile 610.

Data collection device 140 may store data in association with community profile 610, the data in some aspects defining the community associated with community profile 610. For example, community profile 610 may include description data 620, membership data 630, location data 640, triggered action data 650, and historical data 960. Data collection device 140 may perform one or more processes to receive the data, associate the data with community profile 610, and/or to determine additional information based on the data.

In an exemplary embodiment, description data 620 may include information associated with a description of the community associated with community profile 610. For example, description data 620 may include a description of an event associated with the community, such as "highway traffic jam" or "rock concert," or "college basketball game." Description data 620 may further include date, time, and place information that further describes an event associated with the community. In an exemplary embodiment, data collection device 140 may receive description data 620 from a wave device during creation of the community. For example, a user may enter description data 620 to wave device 110, which may be transmitted to data collection device 140 with a request to create the community. Data collection device 140 may be configured to provide description data 620 to one or more wave devices so that a user can better decide whether to accept an invitation to join the community.

In an exemplary embodiment, membership data 630 may include a list of UIDs associated with people, entities, places, and/or objects that are members of the community. For example, data collection device 140 may store as membership data 630 a UID associated with a person that requested creation of the community. As additional wave devices join the community, data collection device 140 may add UIDs associated with those wave devices to membership data 630. Similarly, as wave devices leave the community, data collection device 140 may remove UIDs associated with those wave devices from membership data 630. In this way, data collection device 140 may maintain a current membership list associated with a community.

In an exemplary embodiment, location data 640 may include information associated with a location of the community. For example, location data 640 may include a geographic boundary for the community. In another example, location data 640 may include a current or recent location of a wave device that is associated with a member of the community. Data collection device 140 may use location data 640 to determine geographic information associated with a community, limit membership or interaction capabilities of wave devices based on geographic location, determine a community relevance factor, etc.

In an exemplary embodiment, triggered action data 650 may include information associated with one or more actions to be triggered by data collection device 140. For example, triggered action data 650 may include information to be sent to one or more wave devices when one or more conditions are satisfied. For instance, a message may be sent to the 100th wave device to join a community, an advertisement may be sent to one or more wave devices based date, time, and/or location information, etc.

In an exemplary embodiment, historical data 660 may include historical information associated with a community, such as previous membership data, previous location data, previously shared information, etc. In this way, data collection device 140 may establish a record of a community. In addition data collection device 140 may use historical data 660 to determine a current relevance of a community, such as to determine whether a community has expired.

It should be understood that above-described data is exemplary and that additional or alternative types of data may be stored as part of community profile 610. Data collection device 140 may collect the associated data from wave devices and store the data in association with community profile 610. In addition, data collection device 140 may use the data to determine additional information associated with a community.

In one example, data collection device 140 may use data stored as part of community profile 610 to determine one or more community attributes. For example, data collection device 140 may use membership data 630 and historical data 660, and/or other stored data to determine a community velocity (e.g., a rate of propagation of a communityUID, rate of membership joining, etc.). In another example, data collection device 140 may use membership data 620 and location data 630 to determine a current location of wave devices that are in the community and/or are carrying the communityUID (i.e., a community "ping") and/or determine relative locations (i.e., a community "density"). Data collection device 140 may further use community attributes to perform additional processes, such as to make predictions about communities and/or members of the community (e.g., where a location associated with a community is headed based on community velocity, community density, etc.) and/or to compare communities with each other.

In another example, data collection device 140 may use data, such as triggered action data 640, to perform various processes based on information associated with a community. For example, data collection device 140 may perform a process to send advertisements or other messages to wave devices that are in the community, based on one or more conditions (e.g., a location of a wave device, receipt of a command from a wave device, etc.). Similarly, data collection device 140 may perform one or more processes to determine a relevance of a community and determine whether a community has expired and should be deleted.

In another example, data collection device 140 (or a wave device 105) may analyze information associated with UIDs to determine a community presence in relation to a person. For example, data collection device 140 may identify wave devices that include a person's UID in their payload, and determine which communities those wave devices are members of and/or which communities are most prevalent (e.g., by identifying communityUIDs stored by those wave devices or analyzing membership data 630 associated with multiple community profiles). In this way, data collection device 140 may provide a wave device with one or more communities that may interest a person associated with the wave device and/or predict whether a wave device associated with a person will eventually join the community.

Further, it should be understood that interactive communities are not limited to any particular size or area. As a community continues to propagate throughout many wave devices, the community may cover relatively large areas and include many, if not all, wave devices within a particular area, such as a city or state. Thus, interactive communities may have a wide range of functionality, from direct communication between a few members of a small community to widespread dissemination of information (e.g., a test of an emergency broadcast system). Thus, interactive communities may be adaptable for many different uses.

The following exemplary disclosed processes further describe the operations associated with providing an interactive community. For ease of description, the same unique identifiers are used throughout to refer to the same devices forming the same community. For example, wave device 110 may be associated with and store UID110, wave device 120 may be associated with and store UID120, wave device 130 may be associated with and store UID130, and the community may be associated with communityUID1. Further, UID110, UID120, and UID130 may each be associated with a different person operating multiple devices. It should be understood however, that one or more of UID110, UID120, and UID130 may be associated with an entity, place, or object.

Figure 7:
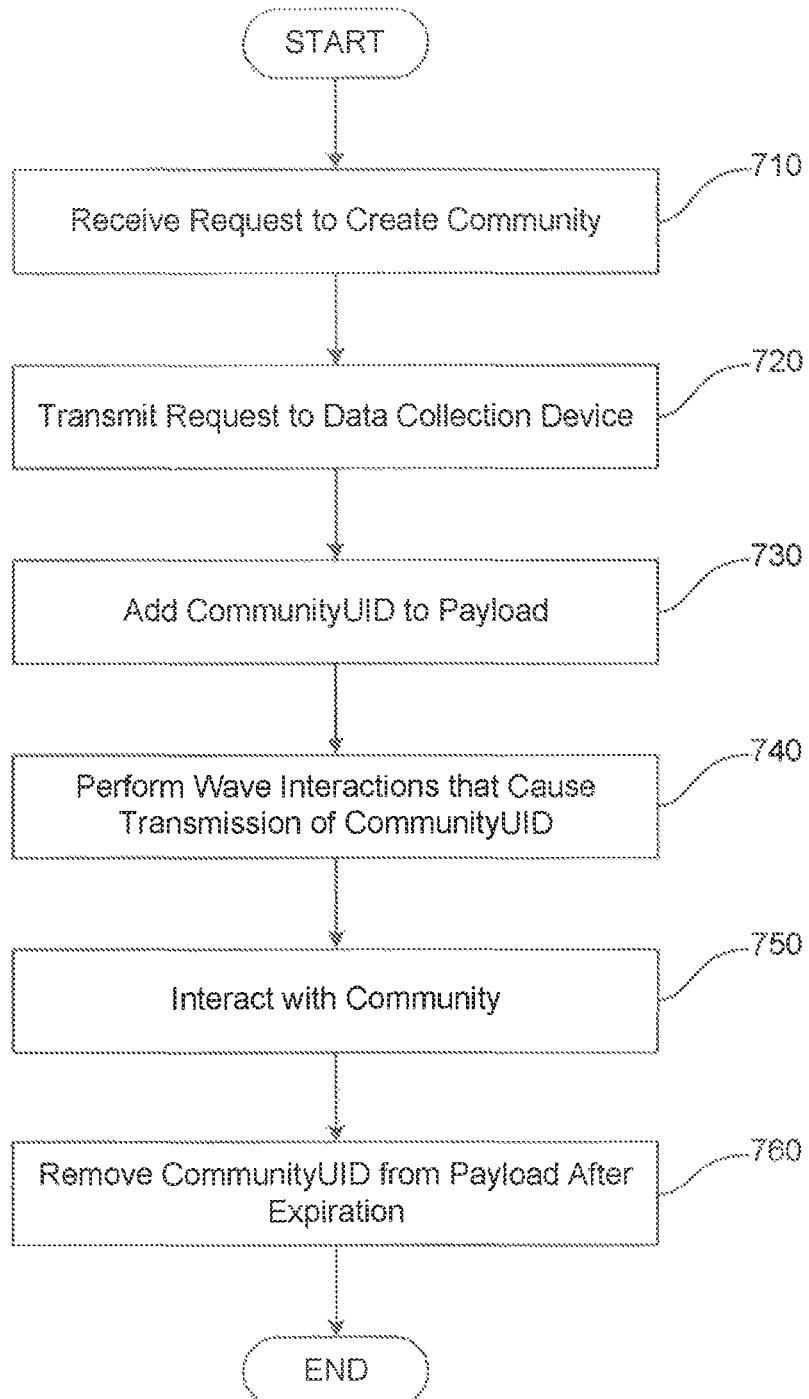
FIG. 7 is a flowchart of an exemplary wave device community creation process, consistent with disclosed embodiments.

FIG. 7 is a flowchart of an exemplary wave device community creation process 700, consistent with disclosed embodiments. In one embodiment, wave device 110 may perform process 700 to create and utilize a community. It should be understood, however, that one or more other wave devices (e.g., wave device 120 and/or 130) may perform process 700.

Wave device 110 may receive a request to create a community (step 710). In one embodiment, wave device 110 may receive a request based on user input. For example, a user may operate wave device 110 to input information that causes wave device 110 to perform operations that cause creation of a community.

In one example, wave device 110 may receive a request to create a community associated with an event. The request may be provided at the time of the event or in advance. The request may include information identifying the event, such as a community title. The request may include additional information, such as the date, time, and/or location of the event. Location information may include a boundary of the event. Additional information may also include expiration information, such as the type of community (e.g., ephemeral, residual, etc.) and/or a duration of the community (e.g., the duration of the sporting event).

Wave device 110 may gather user input and transmit the request to create the community to data collection device 140 (step 720). For example, wave device 110 may transmit received information to data collection device 140. Data collection device 140 may create the community and provide wave device 110 with communityUID1 (e.g., the communityUID associated with the created community). As a result, the community may be created and data collection device 140 may recognize the community with wave device 110 as a member of the community. In addition, wave device 110 may receive communityUID1. For example, wave device 110 may receive communityUID1 from data collection device 140. In other embodiments, wave device 110 may generate communityUID1.

Wave device 110 may add communityUID1 to its payload (step 730). For example, wave device 110 may add communityUID1 to a UID receipt history (e.g., a list of received UIDs and communityUIDs). In another embodiment, wave device 110 may add communityUID1 to a communityUID receipt history (e.g., a list of received communityUIDs only). In yet another embodiment, wave device 110 may store communityUID1 as the only information included with the payload.

Wave device 110 may subsequently perform wave interactions to cause transmission of communityUID1 (step 740). For example, wave device 110 may perform a wave interaction with wave device 120 based on proximity to wave device 120. In an exemplary embodiment, wave device 110 may perform a wave interaction with wave device 120 based on proximity by initiating communication based on wave device 110 and wave device 120 coming into close enough proximity such that a network connection is established (e.g., via Bluetooth®, WiFi, etc.) During the wave interaction, wave device 110 may transmit a payload to wave device 120, the payload including communityUID1.

In one example, wave device 110 may be associated with an event (e.g., near the occurrence of the event). Wave device 120 may also be associated with the event (e.g., also near the occurrence of the event). Wave device 110 and wave device 120, which may be in proximity to each other based on their relationship to the event, may perform a wave interaction, such that wave device 110 transmits communityUID1 to wave device 120.

Wave device 110 may continue to perform wave interactions with additional wave devices (e.g., wave device 130) to further share communityUID1. In addition, wave devices that receive communityUID1 may forward it through subsequent wave interactions. In this way, multiple wave devices may receive communityUID1. In addition, one or more of the wave devices that receive communityUID1 may join the community. In an exemplary embodiment, wave device 120 and wave device 130 may join the community after receiving communityUID1.

Wave device 110 may proceed to interact with the community (step 750). For example, wave device 110 may post a message that is distributed to wave devices 120 and 130. Wave devices 120 and 130 may post response messages that are similarly distributed. In this way, wave devices 110, 120, and 130 (and any number of other wave devices not shown) may share information. In addition, wave device 110 may be configured to display received information. In one embodiment, data collection device 140 may facilitate the community interaction.

At some point, wave device 110 may remove communityUID1 from its payload (step 760). For example, wave device 110 may remove communityUID1 after the community is deactivated by data collection device 140. In another example, wave device 110 may remove communityUID1 from its payload based on one or more factors. For example, wave device 110 may remove communityUID1 after a certain period of time and/or after wave device 110 has left a particular area. Wave device 110 may continue to interact with the community until wave device 110 is removed from the community or the community is deactivated.

Figure 8:
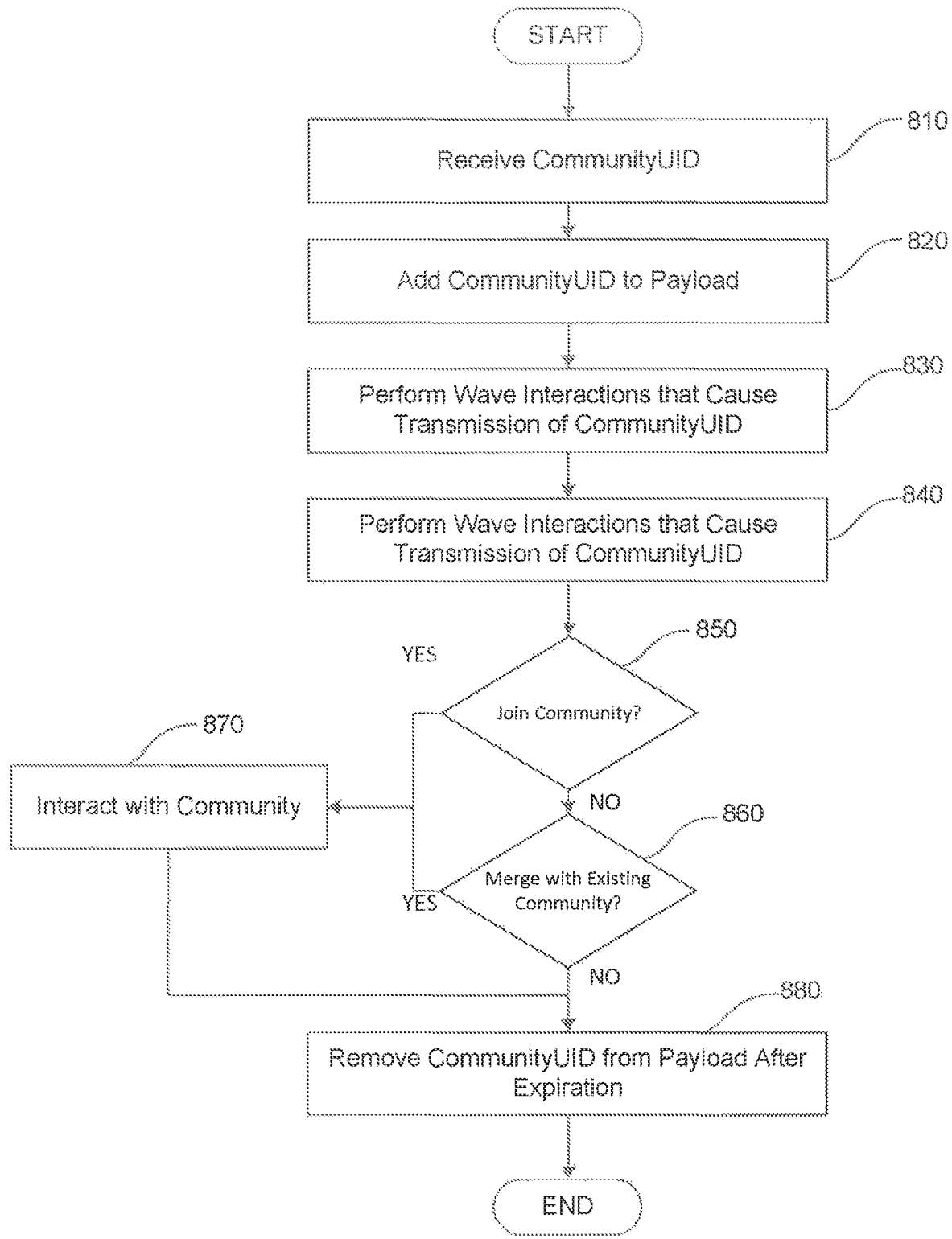
FIG. 8 is a flowchart of an exemplary wave device community joining process, consistent with disclosed embodiments.

FIG. 8 is a flowchart of an exemplary wave device community joining process 800, consistent with disclosed embodiments. In one embodiment, wave device 120 may perform process 800 to join a community. For example, wave device 120 may perform process 800 to join the community created by wave device 110 in process 700.

Wave device 120 may receive communityUID1 (step 810). For example, wave device 120 may receive communityUID1 as a result of a wave interaction with wave device 110 that occurs based on proximity between wave device 110 and wave device 120. In other embodiments, wave device 120 may receive communityUID1 from data collection device 140, such is in instances when data collection device 140 automatically generates a community.

Wave device 120 may add communityUID1 to its payload (step 820). For example, wave device 120 may add communityUID1 to a UID receipt history (e.g., a list of received UIDs and communityUIDs). In another embodiment, wave device 120 may add communityUID1 to a communityUID receipt history (e.g., a list of received communityUIDs only). In yet another embodiment, wave device 120 may store communityUID1 as the only information included with the payload.

Wave device 120 may subsequently perform wave interactions that cause transmission of communityUID1 (step 830). For example, wave device 120 may perform a wave interaction with wave device 130 based on a proximity to wave device 130. During the wave interaction, wave device 130 may receive communityUID1 as part of the payload sent from wave device 120 to wave device 130.

In addition, wave device 120 may transmit communityUID1 to data collection device 140 (step 840). For example, wave device 120 may transmit communityUID1 to data collection device 140 over network 150 (e.g., the Internet, cellular network, etc.). Wave device 120 may subsequently receive information associated with the community. For example, wave device 120 may receive an invitation to join the community, including information describing the community. The information describing the community may include, for example, a title of the community, a description of the community, a location of the community, a duration of the community, members of the community, etc. Wave device 120 may display the invitation to join and the information describing the community.

Wave device 120 may determine whether to join the community (step 850). In one example, wave device 120 may determine whether to join the community based on user input. For instance, wave device 120 may receive user input indicating whether the user chooses for wave device 120 to join the community or decline joining the community. In another example, wave device 120 may automatically determine whether to join the community, such as based on stored settings associated with joining communities.

In some instances, wave device 120 may determine that the community should not be joined (step 850—NO). Wave device 120 may also determine whether the community should be merged with an existing community (step 860). For example, wave device 120 may determine that an existing community was created for the same or a similar purpose to the community associated with communityUID1, and therefore should be merged to form one community for that purpose. In another example, wave device 120 and/or data collection device 140 may determine that communities should be merged based on user input.

If wave device 120 determines that the community should be joined (step 850—YES) or merged with another community (step 860—YES), wave device 120 may become a member of the community. Wave device 120 may subsequently interact with the community (Step 870). For example, wave device 120 may receive information from data collection device 140 (e.g., messages that were shared with the community before wave device 120 joined the community), share information with other wave devices in the community, etc.

If wave device 120 determines that the community should not be joined (step 850—NO) or merged with another community (step 860—NO), or at some point after being a member and interacting with the community, wave device 120 may remove communityUID1 from its payload (step 880). For example, wave device 120 may remove communityUID1 from its payload after a certain period of time, after wave device 120 leaves a particular area, etc.

It should be understood that wave device 130 may similarly perform process 700, such as after performing a wave interaction with wave device 120 in step 730. Wave device 130 may then perform process 700, which may result in wave device 130 also joining the community (e.g., data collection device adding UID130 to the community profile and providing access to wave device 130). In addition, wave device 130 may add communityUID1 to its payload, which may be further sent to additional wave devices through subsequent wave interactions. This process may repeat to populate the community with wave devices.

Figure 9:
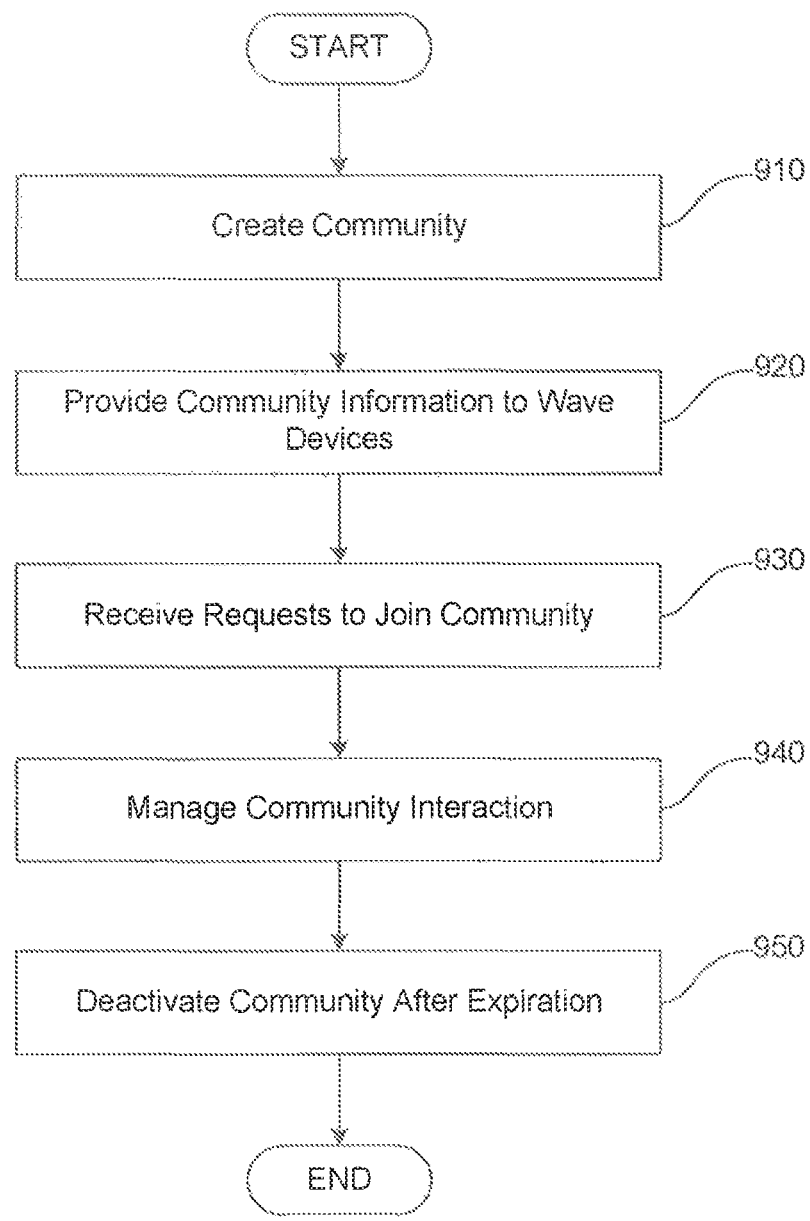
FIG. 9 is a flowchart of an exemplary data collection device community interaction process, consistent with disclosed embodiments.

FIG. 9 is a flowchart of an exemplary data collection device community interaction process 900, consistent with disclosed embodiments. In an exemplary embodiment, data collection device 140 may perform process 900 to provide an interactive community to a plurality of wave devices (e.g., wave devices 110, 120, 130). For example, data collection device 140 may execute software instructions to perform operations that create, manage, and deactivate an interactive community.

Data collection device 140 may create a community (step 910). In one example, data collection device 140 may create a community based on a request from a wave device (e.g., wave device 110). In another example, data collection device 140 may create a community associated with communityUID1 automatically. For instance, data collection device 140 may receive information indicating that a plurality of wave devices have performed wave interactions within a particular area which exceeds a threshold.

In an exemplary embodiment, data collection device 140 may generate a community profile associated with the created community. Data collection device 140 may store information associated with the community as part of the community profile. For instance, data collection device may store a list of UIDs associated with wave devices that are members of the community. For example, after creating the community based on a request form wave device 110, data collection device 140 may add UID110 to the community profile. In this way, data collection device 140 may maintain a list of wave devices that have access to the community and perform operations accordingly (e.g., share information with wave devices that are in the community).

In creating the community, data collection device 140 may generate communityUID1. In the example in which wave device 110 provided a request to create the community, data collection device 140 may transmit communityUID1 to wave device 110, which wave device 110 may transmit to other wave devices (e.g., wave devices 120, 130) through wave interactions.

Data collection device 140 may provide community information to wave devices 120 and 130 (step 920). For example, after wave device 120 receives communityUID1 through a wave interaction with wave device 110, wave device 120 may transmit communityUID1 to data collection device 140. Data collection device 140 may match communityUID1 to the information associated with that community, and provide wave device 120 with an invitation to join the community and information describing the community. Data collection device 140 may repeat this process with each subsequent wave device that receives communityUID1 (e.g., wave device 130).

Data collection device 140 may also receive one or more requests to join the community (step 930). For example, one or more of the wave devices that receive an invitation to join the community may transmit a request to accept the invitation. Data collection device 140 may receive the request and add the corresponding wave device to the community. For example, data collection device 140 may add a UID associated with a wave device to the community profile.

For instance, data collection device 140 may receive a request to join the community from wave device 120. Data collection device 140 may execute software instructions to add wave device 120 to the community, such as by adding UID120 to the community profile associated with the community.

In addition, after the community is created, data collection device 140 may manage community interaction (step 940). For example, wave device 110 and wave device 120 may be members of a created community. Data collection device 140 may receive information from wave device 110 and share the information with other members of the community (e.g., wave device 120). Similarly, data collection device 140 may receive information from wave device 120 and share the information with other members of the community (e.g., wave device 110). In this way, wave devices that are part of a community may interact with each other to share information, such as messages received as user input.

At some point after creating a community, data collection device 140 may deactivate the community (step 950). For example, data collection device 140 may deactivate a community based on the relevance factors described above with respect to process 500. In particular, data collection device 140 may deactivate a community after a certain period of time (e.g., after an event has ended), once activity falls below a threshold (e.g., wave devices no longer share information), after wave devices leave a particular are (e.g., after an event has ended), etc. In some embodiments, a community may be deactivated based on a request from a wave device (e.g., the wave device that requested creation of the community).

The exemplary disclosed processes may be performed to provide an interactive community to a plurality of wave devices. In exemplary embodiments, an interactive community may be created to allow people to communicate with other people that are in proximity to them. Further, because the community may be populated through wave interactions, people may communicate with each other where other forms of technology would not allow them to do so.

In addition, an interactive community may allow information associated with a particular group of people to be determined and shared. For example, data associated with a community may be analyzed and used to determine attributes of the community that describe the members of the community individually or in combination. As a communityUID passes through various wave devices (much like a UID associated with a person, entity, place, or object), a record of the associated wave interactions may be created, allowing a wave device and/or data collection device to determine information associated with the community, such as the data described with respect to FIG. 6. In this way, interactive communities increase and expand available information associated with groups of people.

The exemplary disclosed embodiments describe systems and methods for using device communication to provide an interactive community. The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

What is claimed is:

1. A data collection device for providing an interactive community to
   a plurality of wave devices, comprising:
   at least one memory device storing instructions; and
   at least one processor configured to execute the instructions to perform operations comprising:
   creating a community associated with a community profile, the community profile storing a set of community information;
   providing the community information to a wave device through wave interaction;
   receiving a request from the wave device to join the community;
   authorizing the wave device to join the community; and
   deactivating the community based on relevance factors, by removing the community information associated with the community profile, wherein the relevance factors include an expiration of a time period.

2. The data collection device of claim 1, wherein creating the community comprises creating a community based on a request from a wave device.

3. The data collection device of claim 1, wherein creating the community comprises creating a community based on receipt of information indicating a plurality of wave devices performing wave interactions within a particular area.

4. The data collection device of claim 1, wherein the set of stored community information comprises a list of unique identifiers associated with wave devices that are members of the community.

5. The data collection device of claim 1, wherein the set of stored community information comprises a community unique identifier.

6. The data collection device of claim 5, wherein the provided community information comprises at least one of an invitation to join the community or the community unique identifier.

7. The data collection device of claim 1, wherein the operations comprise managing a community wave interaction between the data collection device and the wave device.

8. The data collection device of claim 7, wherein managing the community wave interaction comprises managing at least two wave devices.

9. The data collection device of claim 7, wherein managing the community wave interaction comprises at least one of transmitting a subset of the community information or transmitting wave transmission payloads.

10. A system for managing community profiles, comprising:
   at least one memory device storing instructions; and
   at least one processor configured to execute the instructions to perform operations comprising:
      identifying a community profile, wherein the community profile comprises a set of person-unique numerical identifiers associated with a person, and a set of wave device-unique numerical identifiers;
      storing a membership list of the set of person-unique numerical identifiers;
      receiving action data associated with the community profile, the action data comprising executable instructions, for the at least one processor, for actions based on triggering events;
      determining an attribute of the community profile based on the action data;
      associating a community-unique numerical identifier with the community profile;
      processing a request for action data associated with the community profile from a communication device;
      transmitting the action data to the requesting communication device;
      updating the stored membership list by removing the person-unique numerical identifier for a person removed from association with the community profile, and removing the set of wave device-unique numerical identifiers associated with the removed person-unique numerical identifier; and
      deactivating the community profile, by removing the set of person-unique numerical identifiers associated with the community profile, when the stored membership list of identifiers decreases below a threshold and a time period expires.

11. The system of claim 10, wherein the action data comprises the community profile attribute.

12. The system of claim 10, wherein the community profile comprises community data related to at least one of an associated person, a wave device, or a community.

13. The system of claim 12, wherein the community-unique numerical identifier comprises information identifying at least one of an associated person, an associated entity, an associated place, or an associated wave device.

14. The system of claim 13, wherein the community-unique numerical identifier is based on the determined attribute of the community profile.

15. A system for activating interactive communities, comprising:
   at least one memory device storing instructions; and
   at least one processor configured to execute the instructions to perform operations comprising:
      receiving executable instructions for a triggering event;
      identifying a plurality of wave devices based on the triggering event instructions;
      receiving data from the identified plurality of wave devices;
      determining a relevance attribute of the identified wave devices based on the data;
      activating an interactive community for the identified wave devices based on the data and determined relevance attribute;
      associating the identified wave devices with the activated interactive community;
      transmitting authorization for the interactive community to at least one of the identified wave devices; and
      deactivating the interactive community based on the relevance factors and an expiration of a time period by removing the associated identified wave devices.

16. The system of claim 15, wherein determining a relevance attribute comprises determining a relevance attribute based on at least one of information associated with an event, proximity between wave devices, or proximity between wave devices and the event.

17. The system of claim 16, wherein the operations comprise transmitting the determined relevance attribute to the identified wave devices associated with the interactive community.

* * * * *